Figure 1:
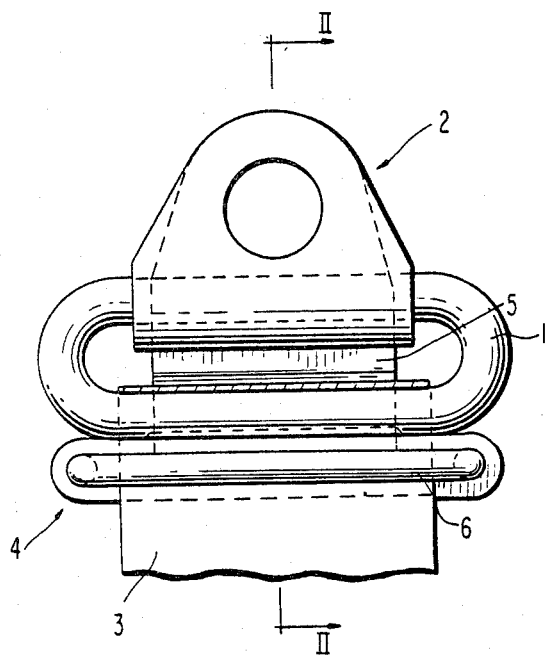

United States Patent [19]

Jahn

[11] 4,341,359
[45] Jul. 27, 1982

[54] GUIDE ARRANGEMENT FOR A SAFETY BELT

[75] Inventor: Walter Jahn, Ehningen, Fed. Rep. of Germany

[73] Assignee: Daimler-Benz Aktiengesellschaft, Stuttgart, Fed. Rep. of Germany

[21] Appl. No.: 142,126

[22] Filed: Apr. 21, 1980

[30] Foreign Application Priority Data

Apr. 20, 1979 [DE] Fed. Rep. of Germany ....... 2915988

[51] Int. Cl.³ ........................ A62B 35/00; B65H 75/48
[52] U.S. Cl. ...................................... 242/107; 280/808
[58] Field of Search ............................ 242/107–107.7; 280/808; 297/475–480, 483

[56] References Cited

U.S. PATENT DOCUMENTS 3,877,114  4/1975  Silen ................................ 280/808 X
4,142,274  3/1979  Scholz et al. ................... 280/808 X

FOREIGN PATENT DOCUMENTS 2600612  7/1976  Fed. Rep. of Germany ...... 297/483

Primary Examiner—John M. Jillions

Attorney, Agent, or Firm—Craig and Antonelli

[57] ABSTRACT

A guide device for a safety belt of a safety belt system for a motor vehicle. A delivery roll is provided from which and onto which the safety belt is wound in a region of the downstream deflector fitting, whereby the guide device, as viewed in a pull out or withdrawal direction of the safety belt, is upstream of a deflector crosspiece of the deflector fitting and is fastened together with the deflector fitting. A guide slot is provided that is narrower than a doubled thickness of the safety belt with a free end of the guide device presenting a runner for the safety belt which runner defines the guide slot with the free end of the guide device. The safety belt passes through the guide slot without deflection and the guide slot or through passage through which the safety belt extends is shifted, with reference to a longitudinal center axis of the deflector crosspiece, by an amount of a radius of curvature of the safety belt that is attainable as a function of a stiffness of the safety belt and retraction force in a wind-up direction in a region of deflection of the safety belt at the deflection crosspiece.

5 Claims, 3 Drawing Figures

GUIDE ARRANGEMENT FOR A SAFETY BELT

The present invention relates to a safety belt arrangement and, more particularly, to a guide arrangement for a safety belt which safety belt is adapted to be wound from or onto a delivery roll of a safety belt system of a motor vehicle wherein, in a region of a downstream deflector fitting, the guide arrangement, as viewed in a pull out direction of the safety belt system, is disposed upstream of a deflector crosspiece of the deflector fitting and fastened together with the deflector fitting, and wherein a guide slot is provided that is narrower than twice a thickness of the safety belt.

A guide arrangement of the aforementioned type is proposed in, for example, German Auslegeschrift No. 26 13 987 (corresponding to U.S. Pat. No. 4,142,274), which guide arrangement effectively prevents a twisting, doubling or clamping of the safety belt. However, a disadvantage of this proposed guide arrangement resides in the fact that a winding-up action of the safety belt system is restricted when the safety belt is very stiff since the proposed guide arrangement for the safety belt system surrounds the deflector crosspiece of the deflector fitting in a manner of a claw over a portion of its periphery and a very slight distance so that the safety belt is forced to have a relatively small bending radius that considerably increases the friction between the belt and deflector crosspiece.

The aim underlying the present invention essentially resides in providing a guide device for a safety belt system that will prevent a twisting, doubling or clamping of the safety belt and which will also have a negative effect on the winding-up action of the safety belt system so that, even if a retration force abates, there will still be an acceptable winding-up of the safety belt.

In accordance with advantageous features of the present invention, a free end of the guide device includes a runner through which the safety belt passes without deflection, with a passage opening of the guide device being adapted to be shifted, with respect to a mid-longitudinal axis of the deflector crosspiece, by an amount equal to at least a radius of curvature of the safety belt which is determined as a function of the stiffness of the belt and retraction force in the winding-up direction of the safety belt system in a region of the belt deflection.

By virtue of the constructional features of the present invention, the runner is disposed outside a range of curvature of the safety belt that is governed by the deflection and assumes no friction increasing deflecting rolls so that the safety belt runs without a change in direction to the safety belt delivery roll.

Advantageously, in accordance with further features of the present invention, the guide device is constructed so as to be elastic or yielding in at least one resilient or elastic region. Alternatively, a resilient pivot point or pivotal connection may be provided which extends in a transverse direction of the motor vehicle.

By virtue of the features of the present invention, the position of the runner is assimilated thereby to a path of the safety belt at any given point in time and a change in a radius of curvature of the safety belt in a zone of deflection caused by, for example, a sudden withdrawing or pulling out of the safety belt, does not lead to an increase in belt friction and, consequently, also does not lead to an increased abrasion of the safety belt.

Accordingly, it is an object of the present invention to provide a guide device for a safety belt which avoids, by simple means, shortcomings and disadvantages encountered in the prior art.

Another object of the present invention resides in providing a guide device for a safety belt which minimizes the friction between the safety belt and portions of the guide device.

A further object of the present invention resides in providing a guiding device for a safety belt system which prevents a twisting, doubling, or clamping of the safety belt.

Yet another object of the present invention resides in providing a guide device for a safety belt system which ensures the continued existence of an acceptable winding-up force of the safety belt.

Figure 2:
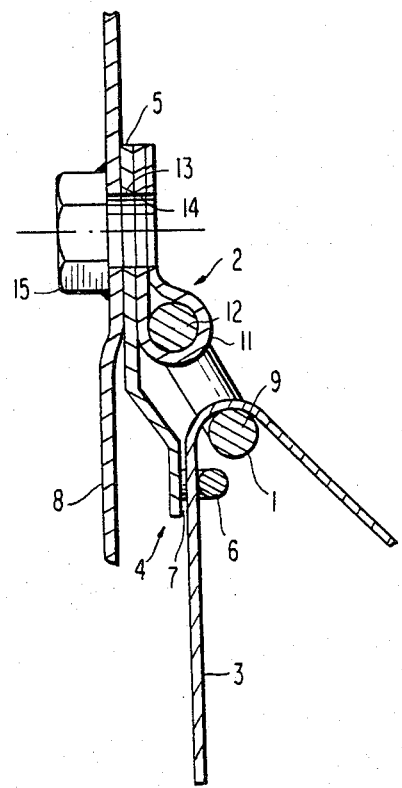
Figure 3:
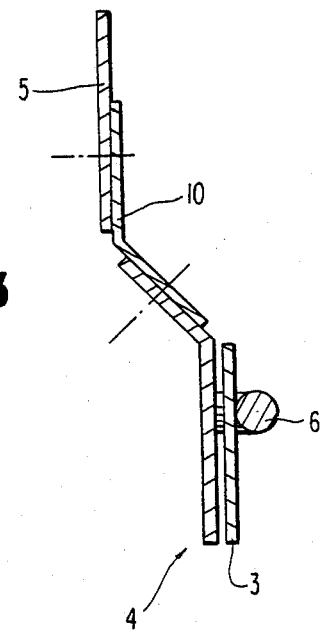

These and other objects, features, and advantages of the present invention will become more apparent from the following description when taken in connection with the accompanying drawings which show, for the purposes of illustration only, two embodiments in accordance with the present invention, and wherein:

FIG. 1 is a front plan view of a deflector fitting provided with a guide device of a resilient material in accordance with the present invention;

FIG. 2 is a cross-sectional view taken along the line II—II of FIG. 1 depicting the deflector fitting, associated with a deflector crosspiece and the guide device of the present invention mounted at a fixed part of the motor vehicle; and FIG. 3 is a cross sectional view of another embodiment of a guide device in accordance with the present invention employing a resilient or elastic pivot arrangement for a free end thereof.

Referring now to the drawings wherein like reference numerals are used throughout the various views to designate like parts and, more particularly, to FIGS. 1 and 2, according to these figures, a safety belt 3 is provided a portion of which, not shown in detail in the drawing, is guided over a deflector crosspiece 1 of a deflector fitting generally designated by the reference numeral 2. The safety belt 3 extends, after passing through a runner 6 disposed at a free end generally designated by the reference numeral 4 of a guide device 5, through a passage or opening 7 defined by the runners 6 and the free end 4 of the device 5, which opening or passage 7 is narrower than a doubled thickness of a safety belt 3, to a delivery roll (not shown).

As shown in FIG. 2, the deflector fitting 2 is mounted together with the guide device 5 to a fixed part 8 of a motor vehicle, which part may, for example, be a middle or center column of a motor vehicle. By use of a conventional means such as, for example, a fastening device and, for example a hanger arrangement it is possible to enable a pivoting of the deflector fitting 2 and a swinging of the guide device 5. More particularly, as shown in FIG. 2, the deflector fitting may, for example, be shaped so as to define an enlarged portion 11 for pivotably accommodating a portion 12 of the deflector crosspiece 1. A fastener 13 such as, for example, a bolt, rivet, or the like, is accommodated in openings 13, 14 provided in the upper portion of the guide device 5 and deflector fitting 2 so as to fix the guide device 5 and deflector fitting 2 to the fixed vehicle part 8 but yet enable the pivoting and swingable movement of the deflector fitting 2 and guide device 5.

By virtue of the mounting of the deflector fitting 2 and guide device 5, the passage or opening 7 of the runner 6 is shifted with respect to the mid-longitudinal axis of the deflector crosspiece 1 in a zone of deflection by at least an amount of a radius of curvature of the safety belt 3 as a function of the stiffness of the safety belt 3 and retraction force in the wind-up direction of the safety belt system.

In the construction of FIGS. 1 and 2, at least the free end 4 may be constructed so as to be resilient or elastic. Alternatively, the whole guide device may be formed of a resilient material such as, for example, a spring steel or a plastic material having corresponding resilient properties.

As shown in FIG. 3, it is also possible in accordance with the present invention to resiliently pivot the free end 4 of the guide device 5 by, for example, employing a leaf spring 10.

A common feature of both of the above described constructions is that, by virtue of the resilient connection, the position of the passage or opening 7 of the runner 6 automatically adjusts itself to the path of the safety belt 3 at any given moment so that, even with varying stiffness of the safety belt 3 and a reduction of the retraction force, the wind-up action of the safety belt system will not be impaired.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. In a guide device for a safety belt of a safety belt system for a motor vehicle which includes a delivery roll means for accommodating the safety belt, a deflector fitting having a deflector crosspiece, and a guide device having a guide slot of a width which is narrower than a doubled thickness of the safety belt, the improvement comprising said guide device being mounted together with said deflector fitting to a fixed vehicle part and extending from said fixed part to a free end, a runner being mounted on the free end of the guide device and defining said guide slot in conjunction therewith, said guide slot being located upstream of said deflector fitting relative to the direction of travel of said safety belt from said delivery roll means, and means for enabling the position of said guide slot to automatically adjust to the path of the safety belt at any given moment by shifting with respect to a longitudinal center axis of the deflector crosspiece by an amount which is at least equal to the radius of curvature of the safety belt that is a function of the stiffness of the safety belt and retraction force in a winding-up direction of the delivery roll means in a region of deflection of the safety belt at the deflector crosspiece, whereby friction between the safety belt and portions of said guide device are minimized.

2. A guide device according to claim 1, characterized in that said means for enabling the guide slot to automatically adjust includes a resilient portion provided at least at the free end of the guide device.

3. A guide device according to claim 1, characterized in that said means for enabling the guide slot to automatically adjust includes a resilient means for connecting said free end of the guide device with an upper portion of the guide device.

4. A guide device according to claim 3, characterized in that said resilient means is a spring member.

5. A guide device according to claim 4, characterized in that said spring member is a leaf spring.

* * * * *